(12) United States Patent
Cheng et al.

(10) Patent No.: US 8,730,211 B2
(45) Date of Patent: May 20, 2014

(54) OPTICAL TOUCH CIRCUIT AND LIQUID CRYSTAL DISPLAY DEVICE USING SAME

(75) Inventors: Yi-Ru Cheng, Hsin-Chu (TW); Ya-Ling Hsu, Hsin-Chu (TW); Yueh-Hung Chung, Hsin-Chu (TW); Hsueh-Ying Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 182 days.

(21) Appl. No.: 13/490,628

(22) Filed: Jun. 7, 2012

(65) Prior Publication Data

US 2013/0100080 A1  Apr. 25, 2013

(30) Foreign Application Priority Data

Oct. 24, 2011  (TW) .............................. 100138590 A

(51) Int. Cl.
  *G06F 3/042* (2006.01)
(52) U.S. Cl.
  USPC ............ 345/175; 345/207; 345/697; 345/173
(58) Field of Classification Search
  USPC ............ 345/87, 173, 175, 98, 100, 207, 211, 345/212, 690, 697; 84/645, 723
  See application file for complete search history.

(56) References Cited

U.S. PATENT DOCUMENTS

| | | | | |
|---|---|---|---|---|
| 6,731,258 B2* | 5/2004 | Lin et al. | ........................ | 345/87 |
| 7,027,027 B2* | 4/2006 | Minamizaki et al. | ........... | 345/98 |
| 7,800,594 B2 | 9/2010 | Nakamura et al. | | |
| 2002/0005111 A1* | 1/2002 | Ludwig | ........................... | 84/645 |
| 2002/0101415 A1* | 8/2002 | Song | ............................. | 345/211 |
| 2003/0020676 A1* | 1/2003 | Lin et al. | ......................... | 345/87 |
| 2004/0099131 A1* | 5/2004 | Ludwig | ............................ | 84/723 |
| 2005/0212791 A1* | 9/2005 | Tsuchi | .......................... | 345/211 |
| 2006/0146038 A1 | 7/2006 | Park et al. | | |
| 2007/0070022 A1* | 3/2007 | Tsuchi et al. | ................. | 345/100 |
| 2008/0198143 A1 | 8/2008 | Kinoshita et al. | | |
| 2008/0203279 A1 | 8/2008 | Kobashi | | |
| 2008/0291192 A1* | 11/2008 | Han et al. | ....................... | 345/212 |
| 2008/0303769 A1* | 12/2008 | Tobita | .............................. | 345/92 |
| 2010/0090996 A1 | 4/2010 | Chou et al. | | |

(Continued)

FOREIGN PATENT DOCUMENTS

| | | |
|---|---|---|
| CN | 1797306 A | 7/2006 |
| CN | 101251783 A | 8/2008 |

(Continued)

OTHER PUBLICATIONS

China Patent Office, "Office Action", Mar. 4, 2014.

*Primary Examiner* — Thuy Pardo
(74) *Attorney, Agent, or Firm* — WPAT, PC; Justin King

(57) ABSTRACT

In an exemplary optical touch circuit and a LCD device using the same, an optical sensing unit is turned on or off according to an irradiation light intensity and accordingly generates a first signal. A first signal readout unit is electrically coupled to the optical sensing unit and turned on or off according to a first operation timing sequence and accordingly outputs the first signal. A touch reference unit is for providing a reference voltage. A second signal readout unit is turned on or off according to a second operation timing sequence and accordingly outputs the reference voltage. The touch sensing unit is electrically coupled to the first and second signal readout units and uses a voltage difference between the first signal and the reference voltage as a basis to determine that whether the optical touch circuit is touched or not.

17 Claims, 6 Drawing Sheets

(56) References Cited

U.S. PATENT DOCUMENTS

2010/0245317 A1* 9/2010 Lin et al. .................. 345/211
2011/0109605 A1* 5/2011 Omori et al. .............. 345/207
2011/0163994 A1 7/2011 Tang et al.
2011/0169772 A1 7/2011 Liu et al.
2012/0086739 A1* 4/2012 Akimoto et al. .......... 345/690

FOREIGN PATENT DOCUMENTS

| | | |
|---|---|---|
| CN | 101655644 A | 2/2010 |
| TW | 200634635 A | 10/2006 |
| TW | 200905655 A | 2/2009 |
| TW | 201015406 A | 4/2010 |
| TW | 201122964 A | 7/2011 |

* cited by examiner

OPTICAL TOUCH CIRCUIT AND LIQUID CRYSTAL DISPLAY DEVICE USING SAME

TECHNICAL FIELD

The disclosure relates to touch sensing systems and display devices thereof, and more particularly to an optical touch circuit and a liquid crystal display (LCD) device using the same.

BACKGROUND

At present, the touch panel generally has several types, such as a resistive type, a capacitive type, an optical type, an electromagnetic type, an ultrasonic wave type, and a LCD in-cell type that has three types of resistive, capacitive and optical. In a display device with an in-cell optical touch panel, a leakage current difference caused by different irradiation light intensities is used to determine that optical sensing elements in the in-cell optical touch panel whether are turned on or not and then serves as a basis for judging the in-cell optical touch panel whether is touched or not.

For example, the optical sensing element may include a thin film transistor (TFT). A TFT leakage current of the optical sensing element in cases that being touched by finger, being irradiated by ambient light and being touched (also being irradiated) by an light pen correspondingly may have a first current value, a second current value and a third current value. Thus, when the optical sensing element receives a large irradiated light intensity, the TFT leakage current Ids is consequently large, that is, the first current value is less than the second current value, and further less than the third current value. The charge difference generated by the difference of the TFT leakage currents is converted to be an output voltage through an integrator, and the output voltage value then is judged for determining whether the in-cell optical touch panel is touched or not.

Some of the present touch sensing manners still adopt(s) a differential sensing principle for judgment. Referring to FIG. 1, a source driver 12, touch sensors 16, gate drivers 14 and scanning sensors 18 are respectively disposed at the upside, the underside, the left side and the right side of the LCD. Generally, when a light stylus/pen 101 irradiates at an area of a liquid crystal panel 10, the touch sensors 16 would sense the change of voltage levels at the irradiated area with a high level and a low level, and the high level and the low level together form a group of judging signal as a basis for judging if the LCD device is touched or not by the light pen 10. However, when the light pen 10 irradiates at an edge of the liquid crystal panel 10, the touch sensors 16 only can sense the high level which would cause that the touch sensor 16 misjudges resulting from the incomplete judging signal.

SUMMARY OF DISCLOSURE

An optical touch circuit includes an optical sensing unit, a first signal readout unit, a touch reference unit, a second signal readout unit, and a touch sensing unit. The optical sensing unit is turned on or turned off according to an irradiation light intensity and accordingly generates a first signal including a first voltage and a second voltage. The first signal readout unit is electrically coupled to the optical sensing unit. The first signal readout unit is turned on or turned off according to a first operation timing sequence and accordingly outputs the first signal. The touch reference unit is disposed at a side of the optical sensing unit and is used for providing a reference voltage. The second signal readout unit is electrically coupled to the touch reference unit. The second signal readout unit is turned on or turned off according to a second operation timing sequence and accordingly outputs the reference voltage. The touch sensing unit is electrically coupled to the first signal readout unit and the second signal readout unit. The touch sensing unit uses a voltage difference between the first signal and the reference voltage as a basis to determine that whether the optical touch circuit is touched or not.

In another aspect, a liquid crystal display device includes a frame, a plurality of scan lines, a plurality of data lines, a plurality of display pixel units, optical touch circuits, a gate driving unit and a scan sensing unit. The frame is used for defining a border of the liquid crystal display device. The plurality of scan lines are disposed in a region surrounded by the frame. The plurality of data lines are disposed in the region surrounded by the frame and arranged crossing over with the plurality of scan lines. The plurality of display pixel units are disposed in the region surrounded by the frame and electrically coupled to the respective scan lines and data lines. The optical touch circuit(s) is/are disposed in the region surrounded by the frame. The optical touch circuit each include an optical sensing unit, a first signal readout unit, a touch reference unit, a second signal readout unit, and a touch sensing unit. The optical sensing unit is turned on or turned off according to an irradiation light intensity and accordingly generates a first signal. The first signal includes a first voltage and a second voltage. The first signal readout unit is electrically coupled to the optical sensing unit. The first signal readout unit is turned on or turned off according to a first operation timing sequence and accordingly outputs the first signal. The touch reference unit is disposed at a side of the optical sensing unit and is used for providing a reference voltage. The second signal readout unit is electrically coupled to the touch reference unit. The second signal readout unit is turned on or turned off according to a second operation timing sequence and accordingly outputs the reference voltage. The touch sensing unit is electrically coupled to the first signal readout unit and the second signal readout unit. The touch sensing unit uses a voltage difference between the first signal and the reference voltage as a basis to determine that if the corresponding optical touch circuit is touched or not. At least one of the touch reference units of the optical touch circuits is disposed at a position closer to the frame than the optical sensing units of the optical touch circuits. The gate driving unit is disposed in the region surrounded by the frame and electrically coupled to the plurality of scan lines. The scan sensing unit is disposed in the region surrounded by the frame. The scan sensing unit is electrically coupled to the optical touch circuits so as to provide a first operation timing sequence and a second operation timing sequence for each of the optical touch circuits.

For above and another objectives, features, and advantages of the present disclosure being better understood and legibly, accompanying embodiments together with the drawings are particularized.

BRIEF DESCRIPTION OF THE DRAWINGS

The disclosure will become more readily apparent to those ordinarily skilled in the art after reviewing the following detailed description and accompanying drawings.

DETAILED DESCRIPTION OF EMBODIMENTS

Figure 1:
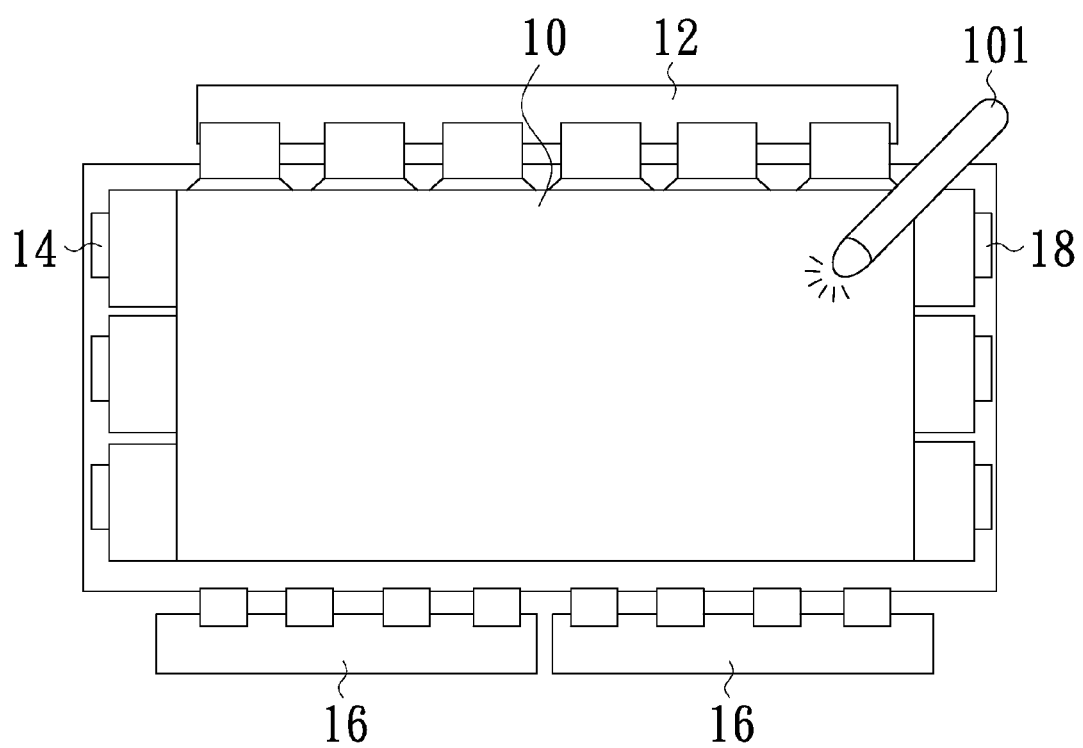
FIG. 1 is a schematic circuit block diagram of a LCD device in prior art.
Figure 2:
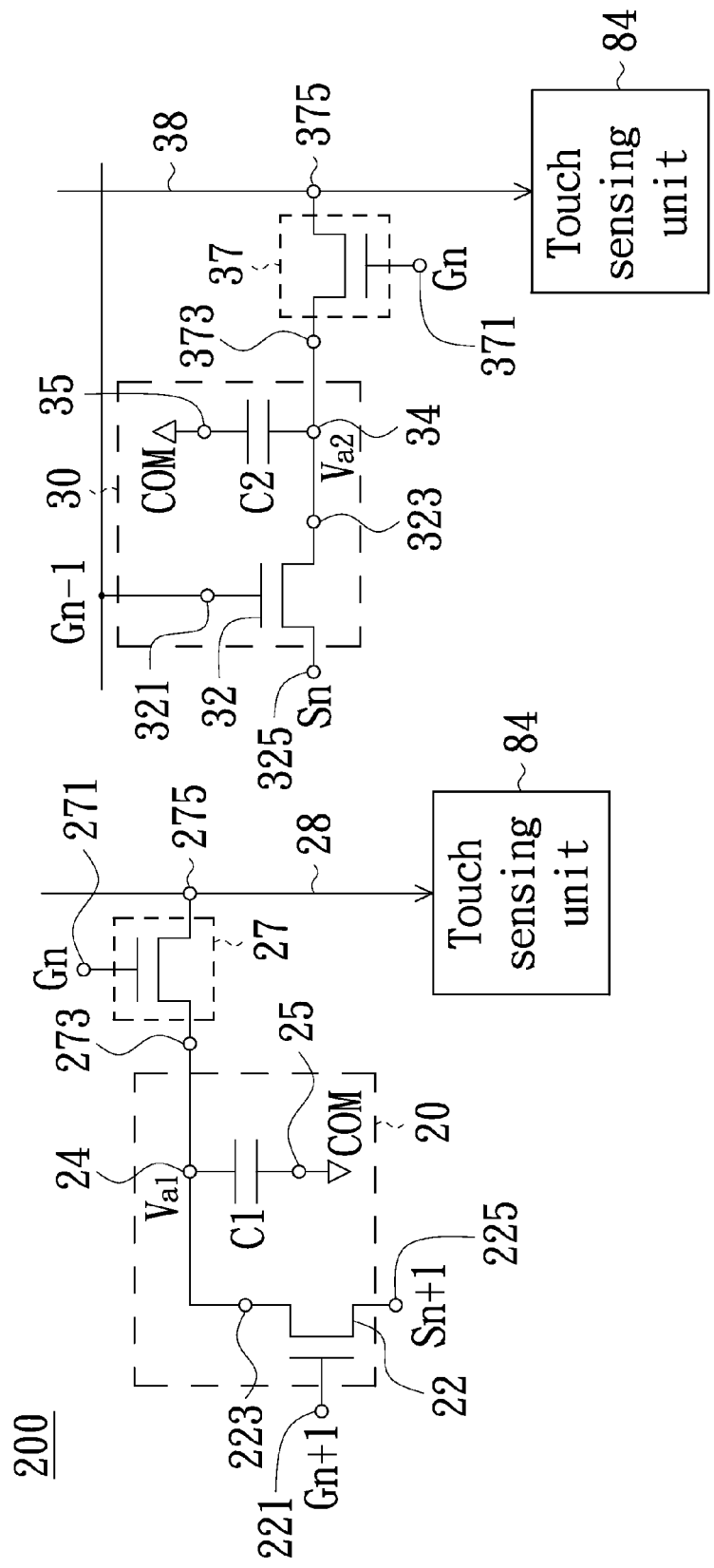
FIG. 2 is a schematic circuit block diagram of an optical touch circuit in accordance with the first embodiment of the disclosure.

FIG. 2 is a schematic circuit block diagram of an optical touch circuit in accordance with a first embodiment of the disclosure. As shown in FIG. 2, the optical touch circuit 200 in accordance with the first embodiment includes an optical sensing unit 20, a first signal readout unit 27, a touch reference unit 30, a second signal readout unit 37, and a touch sensing unit 84.

The optical sensing unit 20 selectively turns on or turns off according to an irradiation light intensity and accordingly generates a first signal. The first signal includes a first voltage and a second voltage. The optical sensing unit 20 may include an optical sensing element 22 and a first storage capacitor C1. For ease of illustration, only one optical sensing unit 20 is shown in FIG. 2, and in practice the number/amount of the optical sensing unit 20 can be flexibly adjusted (e.g., increased or decreased) according to design requirements. Each of the optical sensing unit 20 is electrically coupled to a data line 28 (i.e., generally readout line) through its corresponding first signal readout unit 27. Moreover, in the exemplarily illustrated embodiment, the optical sensing element 22 for example includes a photo thin film transistor (TFT), and the first signal readout unit 27 for example includes a readout TFT.

In particular, the optical sensing element 22 has a first terminal (e.g., generally a gate) 221, a second terminal (e.g., generally a source) 223 and a third terminal (e.g., generally a drain) 225. The first terminal 221 of the optical sensing element 22 receives a first control signal $G_{n+1}$. The second terminal 223 of the optical sensing element 22 is electrically coupled to the first signal readout unit 27, and more specifically the second terminal 223 of the optical sensing element 22 is electrically coupled to a second terminal 273 of the first signal readout unit 27.

Moreover, the third terminal 225 of the optical sensing element 22 receives a second control signal $S_{n+1}$. An electrical pathway between the second terminal 223 and the third terminal 225 of the optical sensing element 22 is turned on or turned off subjecting to the control of the first control signal $G_{n+1}$ and the irradiation light intensity. For example, if the first control signal $G_{n+1}$ is at a high voltage level or the irradiation light intensity is larger than a threshold value, the optical sensing element 22 is turned on. On the contrary, if the first control signal $G_{n+1}$ is at zero or low voltage level or the irradiation light intensity is less than the threshold value, the optical sensing element 22 is turned off.

The first storage capacitor C1 is electrically disposed between the optical sensing element 22 and the first signal readout unit 27. In particular, the first storage capacitor C1 has a first terminal 24 and a second terminal 25. The first terminal 24 of the first storage capacitor C1 is electrically coupled to the second terminal 223 of the optical sensing element 22. The second terminal 25 of the first storage capacitor C1 is electrically coupled to a common electrode COM.

The first signal readout unit 27 is electrically coupled to the optical sensing unit 20. The first signal readout unit 27 is turned on or turned off according to a first operation timing sequence and accordingly outputs the first signal provided by the optical sensing unit 20.

The first signal readout unit 27 has a first terminal (e.g., generally a gate) 271, the second terminal (e.g., generally a source) 273 and a third terminal (e.g., generally a drain) 275. The first terminal 271 of the first signal readout unit 27 receives a third control signal $G_n$. The second terminal 273 of the first signal readout unit 27 is electrically coupled to the first terminal 24 of the first storage capacitor C1. The third terminal 275 of the first signal readout unit 27 is electrically coupled to the touch sensing unit 84. More specifically, the third terminal 275 of the first signal readout unit 27 is electrically coupled to the touch sensing unit 84 through the data line 28. The first signal readout unit 27 may be constituted by a TFT or other switch element with same or similar nature as TFT.

Referring still to FIG. 2, the touch reference unit 30 is disposed at a side, for example, left, right, top or bottom side of the optical sensing unit 20. Further, the touch reference unit 30 is disposed at a side of the data line 28. The touch reference unit 30 is used for providing a reference voltage. It needs to be pointed out that, the touch reference unit 30 advantageously is disposed at an unresolved edge, so as to provide a reference voltage to the touch sensing unit 84 for operation and thereby to reduce or avoid the possible misjudgment of the touch sensing unit 84. The touch reference unit 30 for example includes a switch element 32 and a second storage capacitor C2. In addition, the touch reference unit 30 may adopt a same circuit structure as the optical sensing unit 20 but wherein a photosensitive area of the optical sensing element 22 in the optical sensing unit 20 is shielded instead.

Similarly, for ease of illustration, only one touch reference unit 30 is shown in FIG. 2, and in practice the number/amount of the touch reference unit 30 can be flexibly adjusted (e.g., increased or decreased) according to design requirements. The touch reference unit 30 is electrically coupled to a data line (i.e., generally readout line) 38 through its corresponding second signal readout unit 37. The touch reference unit 30 preferably has a same number/amount as the optical sensing unit 20.

The switch element 32 has a first terminal (e.g., generally a gate) 321, a second terminal (e.g., generally a source) 323 and a third terminal (e.g., generally a drain) 325. The first terminal 221 of the switch element 32 receives a fourth control signal $G_{n-1}$. The second terminal 323 of the switch element 32 is electrically coupled to the second signal readout unit 37. The third terminal 325 of the switch element 32 receives a fifth control signal $S_n$. An electrical pathway between the second terminal 323 and the third terminal 325 of the switch element 32 is turned on or turned off subjecting to the control of the fourth control signal Gn−1.

The switch element 32 can be exemplarily implemented by a TFT or other switch element with same or similar nature as TFT, or the switch element formed by shielding the photosensitive area of the optical sensing element 22. It needs to be pointed out that, the type of the fifth control signal $S_n$ received by the third terminal 325 of the switch element 32 is not limited. For example, the fifth control signal $S_n$ can be a direct current (DC) signal, an alternating current (AC) signal, or the voltage level on the common electrode COM.

The first storage capacitor C2 is electrically disposed between the switch element 32 and the second signal readout unit 37. The second storage capacitor C2 has a first terminal 34 and a second terminal 35. The first terminal 34 of the second storage capacitor C2 is electrically coupled to the second terminal 323 of the switch element 32. The second terminal 35 of the second storage capacitor C2 is electrically coupled to the common electrode COM.

The second signal readout unit 37 is electrically coupled to the touch reference unit 30. The second signal readout unit 37 is turned on or turned off according to a second operation timing sequence and accordingly outputs the reference voltage provided by the touch reference unit 30.

The second signal readout unit 37 has a first terminal (e.g., generally a gate) 371, a second terminal (e.g., generally a source) 373 and a third terminal (e.g., generally a drain) 375. The first terminal 371 of the second signal readout unit 37 receives the third control signal $G_n$. The second terminal 373 of the second signal readout unit 37 is electrically coupled to the first terminal 34 of the second storage capacitor C2. The third terminal 375 of the second signal readout unit 37 is electrically coupled to the touch sensing unit 84. More specifically, the third terminal 375 of the second signal readout unit 37 is electrically coupled to the touch sensing unit 84 through the data line 38. The second signal readout unit 37 can be exemplarily implemented by a TFT or other switch element with same or similar nature as TFT.

The touch sensing unit 84 is electrically coupled to the first signal readout unit 27 and the second signal readout unit 37. The touch sensing unit 84 uses a voltage level difference between the first signal and the reference voltage as a basis to determine the optical touch circuit 200 whether is touched or not. The touch sensing unit 84 exemplarily adopts a differential mode for operation. For example, the touch sensing unit 84 performs an operation of voltages sensed at a latter position subtracting corresponding voltages sensed at a former position, if the subtraction results are a positive voltage level and a negative voltage level, the touch sensing unit 20 would determine that there is a touch operation occurs. Accordingly, if a light irradiated area just falls upon the optical sensing unit 20 and the touch reference unit 30, the touch reference unit 30 provides a negative voltage level to the touch sensing unit 84 for position sensing. For example, if the first signal and the reference voltage both are at high voltage levels, the touch sensing unit 84 determines/judges that the optical touch circuit 200 is not touched. If the first signal and the reference voltage both are at low voltage levels, the touch sensing unit 84 judges that the optical touch circuit 200 is not touched. If the voltage levels of the first signal and the reference voltage respectively at a high level and a low level, the touch sensing unit 84 judges that the optical touch circuit 200 is touched. Otherwise, the touch sensing unit 84 is exemplarily composed of a differential integrated circuit.

The above description only can be considered as an example and is not to limit the judging mode of the touch sensing unit 84. For example, a difference value operation manner can be used as a judging basis instead. Specifically, voltage levels of the first signal and the reference voltage are performed with a difference value operation, and the difference value then is compared with a predetermined value so as to obtain a required result.

Figure 3:
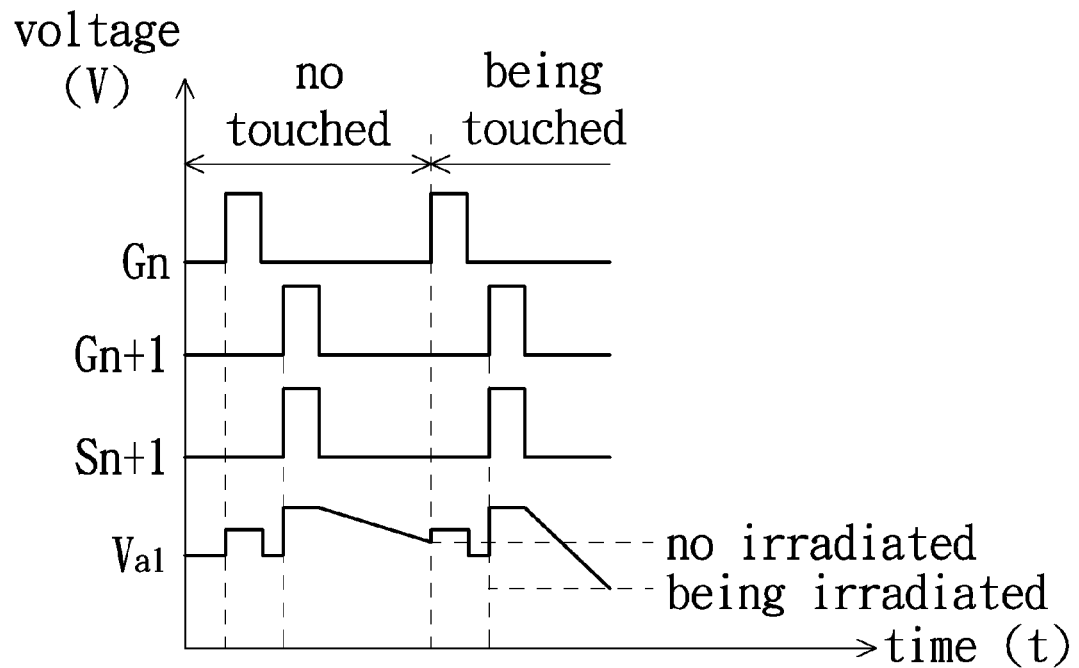
FIG. 3 is a schematic signal timing sequence diagram of an optical sensing unit and a first signal readout unit in accordance with the first embodiment.
Figure 4:
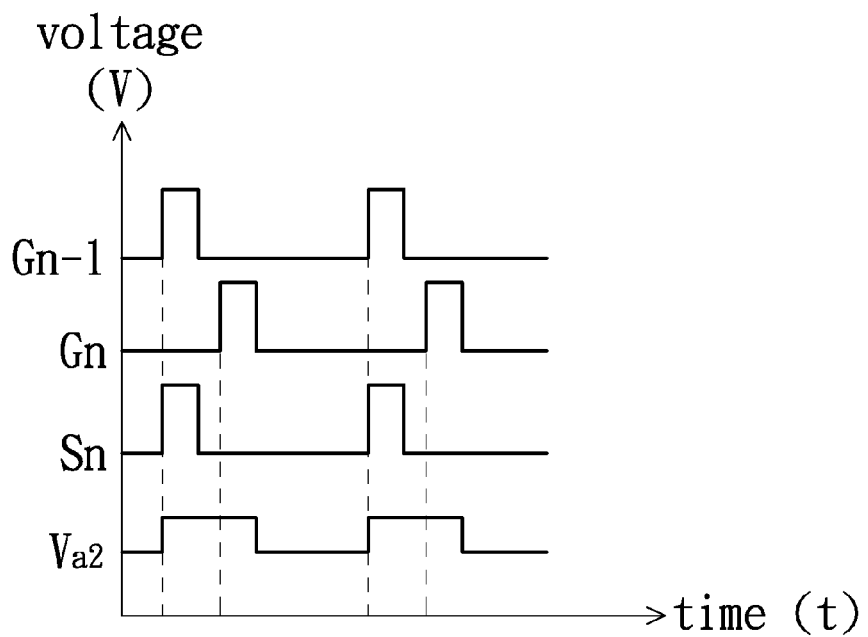
FIG. 4 is a schematic signal timing sequence diagram of a touch reference unit and a second signal readout unit in accordance with the first embodiment.

Subsequently, also referring to FIGS. 3 and 4 together, FIG. 3 is a schematic signal timing sequence diagram of the optical sensing unit and the first signal readout unit in accordance with the first embodiment, and FIG. 4 is a schematic signal timing sequence diagram of the touch reference unit and the second signal readout unit in accordance with the first embodiment. An operation principle of the optical touch circuit 200 will be described as follows with reference to FIGS. 2, 3 and 4.

Firstly, if the first control signal $G_{n-1}$ is at a high voltage level, the switch element 32 is turned on and accordingly a signal reset action is performed. In the next timing sequence, if the third control signal $G_n$ is at a high voltage level, the first signal readout unit 27 and the second signal readout unit 37 both are turned on, the touch sensing unit 84 performs a readout operation and judges whether there is a touch occurs or not.

Subsequently, in the further next timing sequence, by rising the first control signal $G_{n+1}$ to a high voltage level, the switch element 22 is turned on and accordingly another signal reset action is performed. The optical sensing unit 22 performs a detection of light irradiation in a period starting from the first control signal $G_{n+1}$ until to the third control signal $G_n$ of a next image frame. During the next image frame is started, the second signal readout unit 27 is turned on by the third control signal $G_n$, and the touch sensing unit 84 performs a signal readout operation again.

Since a terminal voltage Va2 of the second storage capacitor C2 can be provided as a reference voltage to the touch sensing unit 84, different voltage levels of the terminal voltage Va1 of the first storage capacitor C1 can be used as a basis for the touch sensing unit 84 to judge the optical touch circuit 200 whether being irradiated or not by a light stylus/pen (not shown in FIGS. 2 through 4). For example, if the terminal voltage Va1 is at high voltage level, which represents not being irradiated by the light stylus, the touch sensing unit 84 can judge that the optical touch circuit 200 is not touched. If the terminal voltage Va1 is at low voltage level, which represents being irradiated by the light pen, and the touch sensing unit 84 can judge that the optical touch circuit 200 is touched.

It needs to be pointed out that, as illustrated in the first embodiment, the first operation timing sequence is that the rising edge of the third control signal $G_n$ is prior to the rising edge of the first control signal $G_{n+1}$; and the second operation timing sequence is that the rising edge of the fourth control signal $G_{n-1}$ is prior to the rising edge of the third control signal $G_n$. In other words, in the first embodiment, the optical sensing unit 20 firstly performs a signal readout out operation and then performs signal reset operation, the touch reference unit 30 first performs signal reset operation and the then performs signal readout operation, but they are not to limit the disclosure.

Figure 5:
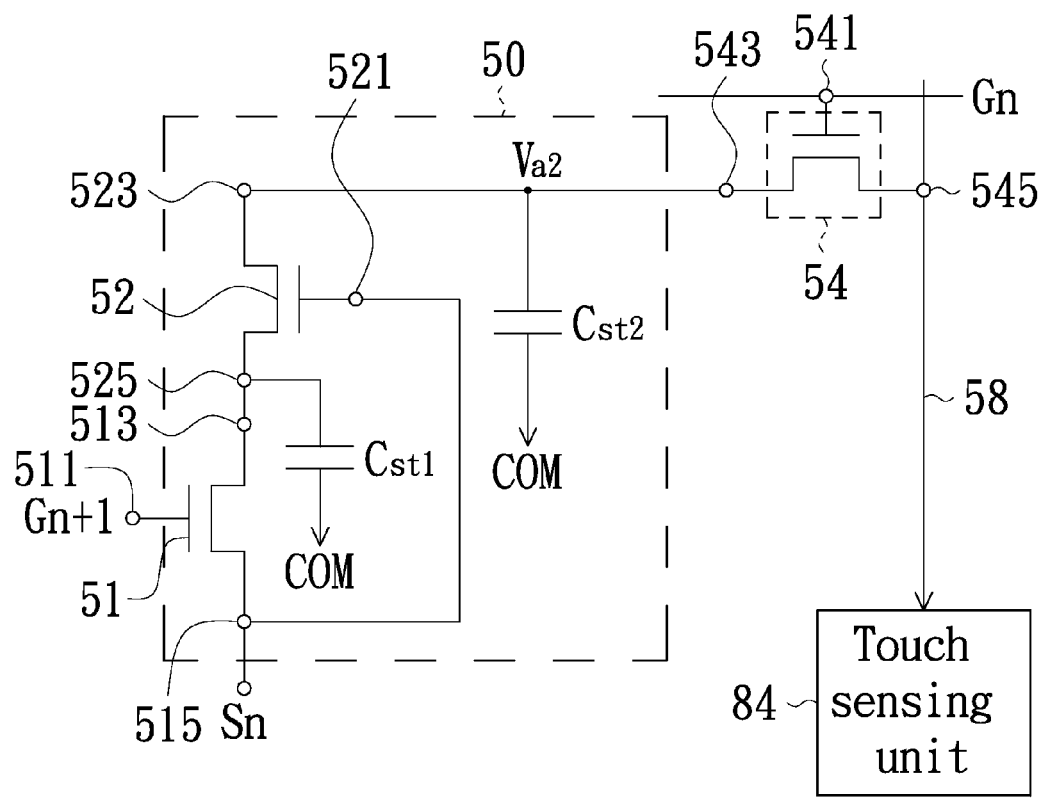
FIG. 5 is a schematic circuit block diagram of a second embodiment of the touch reference unit in accordance with the disclosure.

Referring to FIG. 5, FIG. 5 is a schematic circuit block diagram of a second embodiment of the touch reference unit in accordance with the disclosure. As shown in FIGS. 2 and 5, the touch reference unit 50 in FIG. 5 can also be disposed at a side of the optical sensing unit 20 and the first signal readout unit 27, that is, the position of the touch reference unit 30 can be replaced by the touch reference unit 50. The touch sensing unit 20 and the first signal readout unit 27 have been described in the above first embodiment, and thus will not be repeated herein.

The touch reference unit 50 exemplarily includes a first switch element 51, a second switch element 52, a first storage capacitor Cst1 and a second storage capacitor Cst2.

The first switch element 51 has a first terminal (e.g., generally a gate) 511, a second terminal (e.g., generally a source) 513 and a third terminal (e.g., generally a drain) 515. The first terminal 511 of the first switch element 51 receives the first control signal $G_{n+1}$. The second terminal 513 of the first switch element 51 is electrically coupled to the second switch element 52. The third terminal 515 of the first switch element 51 receives the fifth control signal $S_n$. An electrical pathway between the second terminal 513 and the third terminal 515 of the first switch element 51 is turned on or turned off subjecting to the control of the first control signal $G_{n+1}$. Similarly, the first switch element 51 can be exemplarily implemented by a TFT or other switch element with same or similar nature as the TFT, or a switch element formed by shielding a photosensitive area of the optical sensing element 22.

The second storage capacitor Cst1 is electrically disposed between the first switch element 51 and the second switch element 52. The first terminal (not labeled) of the second storage capacitor Cst1 is electrically coupled to the second terminal 513 of the first switch element 51. The second terminal (not labeled) of the second storage capacitor Cst1 is electrically coupled to the common electrode COM.

The second switch element 52 has a first terminal (e.g., generally a gate) 521, a second terminal (e.g., generally a source) 523 and a third terminal (e.g., generally a drain) 525. The first terminal 521 of the second switch element 52 is electrically coupled to the third terminal 515 of the first switch element 51. The second terminal 523 of the second switch element 52 is electrically coupled to the second signal readout unit 54. The third terminal 525 of the second switch element 52 is electrically coupled to the second terminal 513 of the first switch element 51. An electrical pathway between the second terminal 523 and the third terminal 525 of the second switch element 52 is turned on or turned off subjecting to the control of the fifth control signal $S_n$. Similarly, the second switch element 52 has a circuit structure same or similar as the first switch element 51, or can be a switch element formed by shielding a photosensitive area of the optical sensing element 22.

The third storage capacitor Cst2 is electrically disposed between the second switch element 52 and the second signal readout unit 54. The first terminal (not labeled) of the third storage capacitor Cst2 is electrically coupled to the second terminal 523 of the second switch element 52. The second terminal (not labeled) of the third storage capacitor Cst2 is electrically coupled to the common electrode COM.

The second signal readout unit 54 is electrically coupled to the touch reference unit 50. The second signal readout unit 54 is turned on or turned off according to a second operation timing sequence and accordingly outputs the reference voltage provided by the touch reference unit 50.

The second signal readout unit 54 has a first terminal (e.g., generally a gate) 541, a second terminal (e.g., generally a source) 543 and a third terminal (e.g., generally a drain) 545. The first terminal 541 of the second signal readout unit 54 receives the third control signal $G_n$. The second terminal 543 of the second signal readout unit 54 is electrically coupled to the first terminal of the third storage capacitor Cst2. The third terminal 545 of the second signal readout unit 54 is electrically coupled to the touch sensing unit 84. Specifically, the third terminal 545 of the second signal readout unit 54 is electrically coupled to the touch sensing unit 84 through the data line (i.e., generally readout line) 58. Similarly, the second signal readout unit 54 can be exemplarily implemented by a TFT or other switch element with same or similar nature as TFT.

The touch sensing unit 84 is electrically coupled to the first signal readout unit 27 (as shown in FIG. 2) and the second signal readout unit 54. The touch sensing unit 84 uses a voltage different between the first signal and the reference voltage as a basis to determine/judge the optical touch circuit 200 whether is touched or not.

Figure 6:
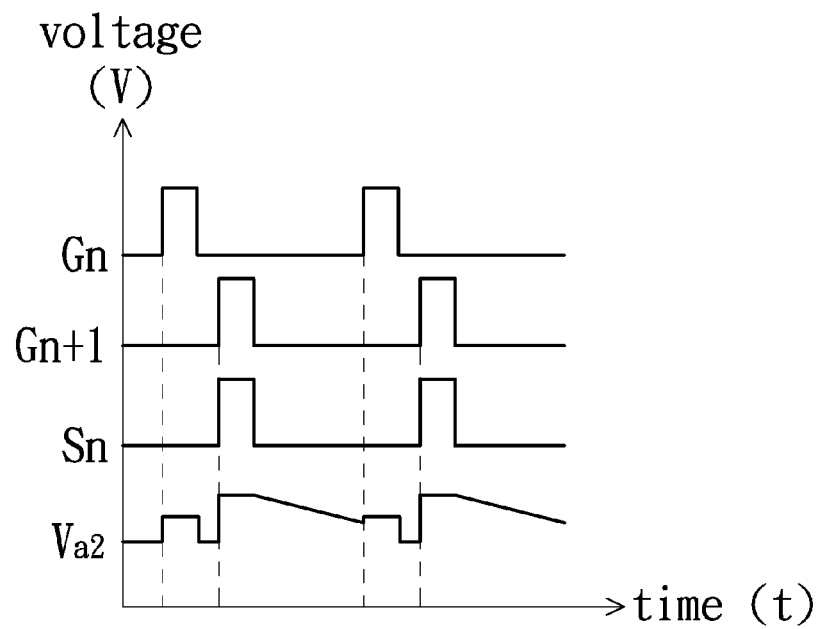
FIG. 6 is a schematic signal timing sequence diagram of the second embodiment of the touch reference unit and the second signal readout unit in accordance with the disclosure.

Referring to FIG. 6, FIG. 6 is a schematic signal timing sequence diagram of the second embodiment of the touch reference unit and the second signal readout unit in accordance with the disclosure. As shown in FIGS. 5 and 6, the touch reference unit 50 and the second signal readout unit 54 can use the same timing sequence signal same as the optical sensing unit 20 and the first signal readout unit 27. The touch reference unit 50 and the touch reference unit 20 (as shown in FIG. 2) have same or similar circuit operation principle, and hereby will not be repeated. In addition, it needs to be pointed out that, as illustrated in the second embodiment, the first operation timing sequence and the second operation timing sequence both are that the rising edge of the third control signal $G_n$ is prior to the rising edge of the first control signal $G_{n+1}$.

Figure 7:
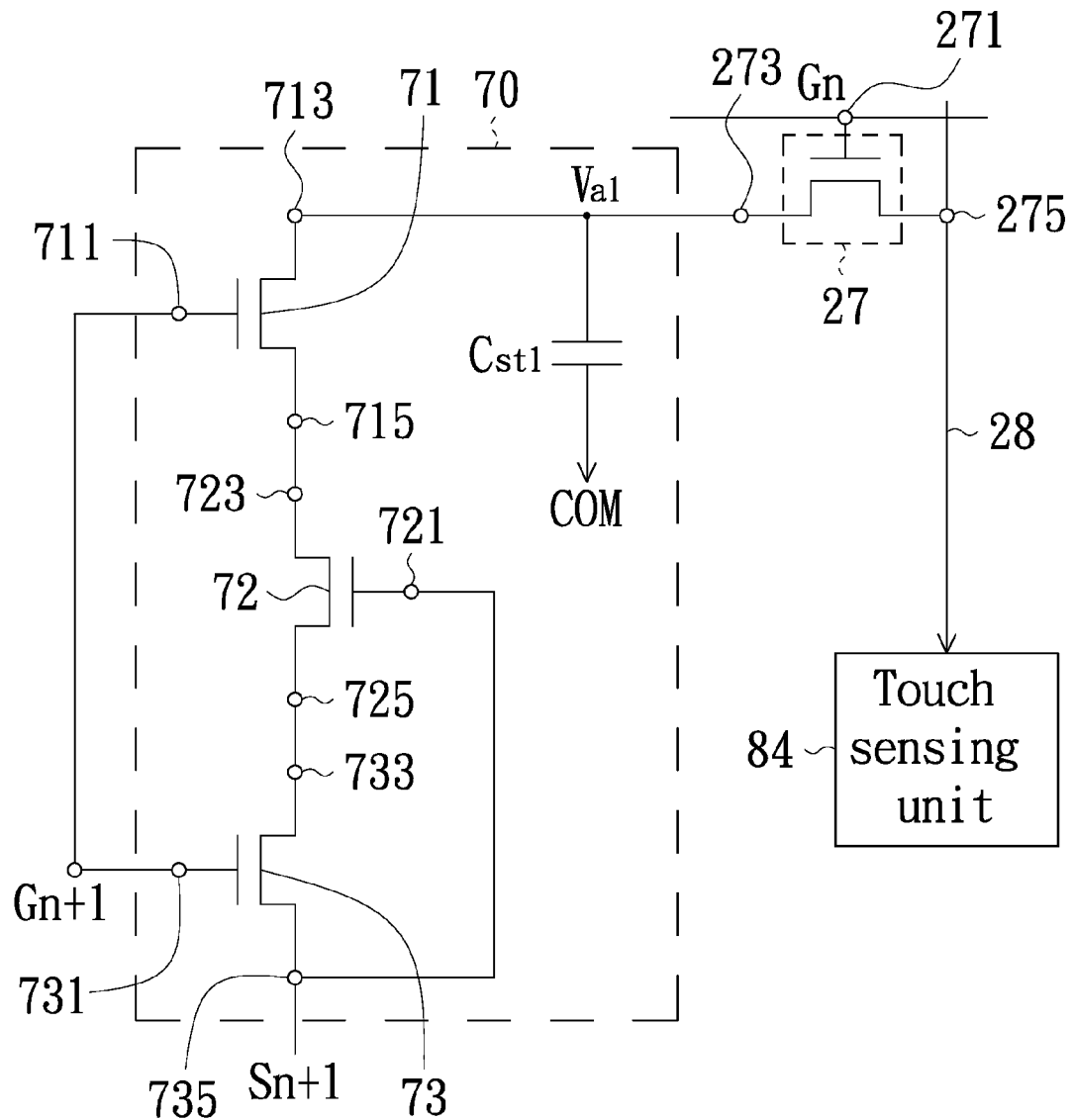
FIG. 7 is a schematic circuit block diagram of a second embodiment of the optical sensing unit in accordance with the disclosure.

Referring to FIG. 7, FIG. 7 is a schematic circuit block diagram of a second embodiment of the optical sensing unit in accordance with the disclosure. As shown in FIG. 7, the optical sensing unit 70 is turned on or turned off according to irradiation light intensity and accordingly generates a first signal. The first signal includes a first voltage and a second voltage. The optical sensing unit 70 exemplarily includes a first optical sensing element 71, a second optical sensing element 72, a third optical sensing element 73 and a storage capacitor Cst1.

In particular, the first optical sensing element 71 has a first terminal (e.g., generally a gate) 711, a second terminal (e.g., generally a source) 713 and a third terminal (e.g., generally a drain) 715. The first terminal 711 of the first optical sensing element 71 receives the first control signal $G_{n+1}$. The second terminal 713 of the first optical sensing element 71 is electrically coupled to the first signal readout unit 27, and more specifically the second terminal 713 of the optical sensing element 71 is electrically coupled to the second terminal 273 of the first signal readout unit 27.

The second optical sensing element 72 has a first terminal (e.g., generally a gate) 721, a second terminal (e.g., generally a source) 723 and a third terminal (e.g., generally a drain) 725. The first terminal 721 of the second switch element 72 is electrically coupled to a third terminal 735 of the third optical element 73. The second terminal 723 of the second optical sensing element 72 is electrically coupled to the third terminal 715 of the first optical element 71.

The third optical sensing element 73 has a first terminal (e.g., generally a gate) 731, a second terminal (e.g., generally a source) 733 and the third terminal (e.g., generally a drain) 735. The first terminal 731 of the third optical sensing element 73 receives the first control signal $G_{n+1}$. The second terminal 733 of the third optical sensing element 73 is electrically coupled to the third terminal 725 of the second optical element 72. The third terminal 735 of the third optical sensing element 73 receives the second control signal $S_{n+1}$.

Moreover, an electrical pathway between the second terminal 713 and the third terminal 715 of the first optical sensing element 71 is turned on or turned off subjecting to the control of the first control signal $G_{n+1}$ and the irradiation light intensity. Similarly, an electrical pathway between the second terminal 733 and the third terminal 735 of the third optical sensing element 73 is turned on or turned off subjecting to the control of the first control signal $G_{n+1}$ and the irradiation light intensity. An electrical pathway between the second terminal 723 and the third terminal 725 of the second optical sensing element 72 is turned on or turned off subjecting to the control of the second control signal $S_{n+1}$ and the irradiation light intensity.

The storage capacitor Cst1 is electrically disposed between the first optical sensing element 71 and the first signal readout unit 27. The first terminal (not labeled) of the storage capacitor Cst1 is electrically coupled to the second terminal 713 of the first optical sensing element 71. The second terminal (not labeled) of the storage capacitor Cst1 is electrically coupled to the common electrode COM.

The first signal readout unit 27 is electrically coupled to the optical sensing unit 70. The first signal readout unit 27 is turned on or turned off according to a first operation timing sequence and accordingly outputs the first signal provided by the optical sensing unit 70.

The first signal readout unit 27 has a first terminal (e.g., generally a gate) 271, a second terminal (e.g., generally a source) 273 and a third terminal (e.g., generally a drain) 275. The first terminal 271 of the first signal readout unit 27 receives the third control signal $G_n$. The second terminal 273 of the first signal readout unit 27 is electrically coupled to the first terminal (not labeled) of the storage capacitor Cst1. The third terminal 275 of the first signal readout unit 27 is electrically coupled to the touch sensing unit 84. More specifically, the third terminal 275 of the first signal readout unit 27 is electrically coupled to the touch sensing unit 84 through the data line 28. The first signal readout unit 27 can be exemplarily implemented by a TFT or other switch element with same or similar nature as TFT.

Figure 8:
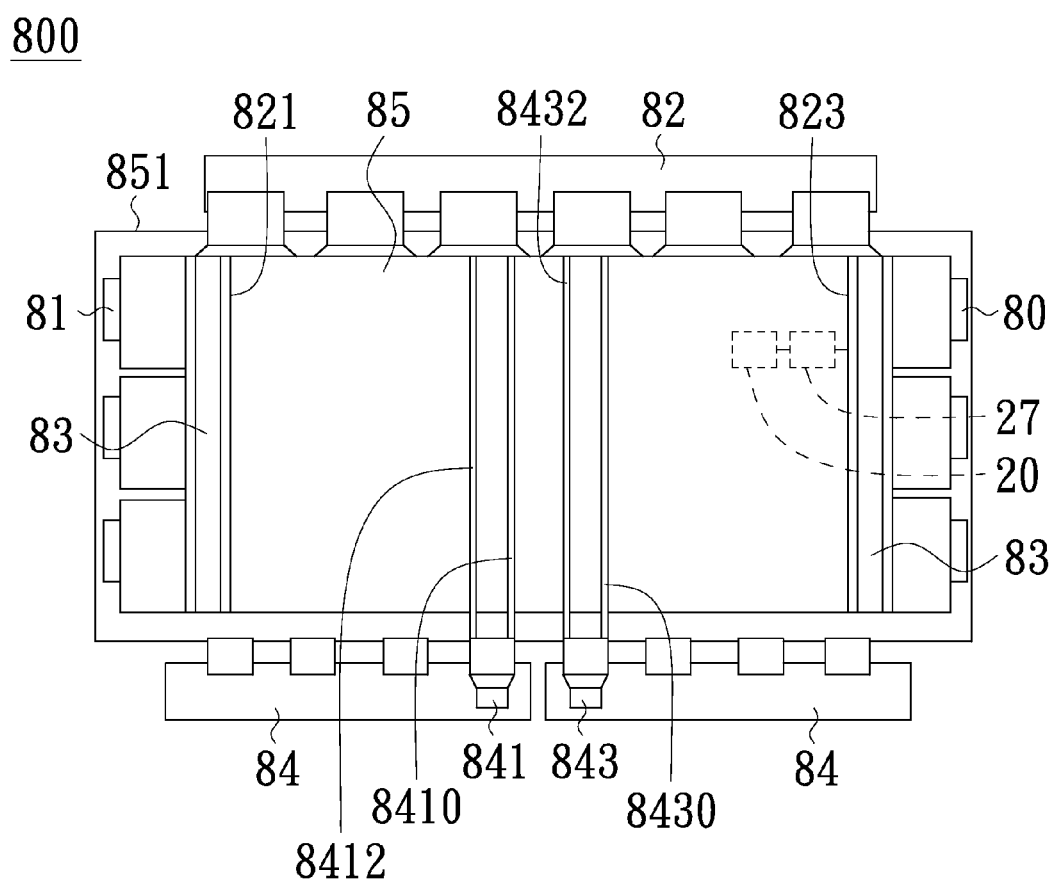
FIG. 8 is a schematic circuit block diagram of a LCD device in accordance with an embodiment of the disclosure.

Referring to FIG. 8, FIG. 8 is a schematic circuit block diagram of a liquid crystal display (LCD) device in accordance with an embodiment of the disclosure. As shown in FIG. 8, the LCD device 800 exemplarily has a frame 851 for defining a border of the LCD device 800. Scan sensing units 80 are disposed at a right side of the LCD device 800. Gate driving units 81 are disposed at an opposite side of the scan sensing units 80, i.e., the left side of the LCD device 800. The scan sensing units 80 and the gate driving units 81 can be disposed at a same side of the LCD 800 device instead. The scan sensing units 80 each are electrically coupled to one or more optical touch circuits 200 as shown in FIG. 2. The scan sensing units 80 can be used for providing the first operation timing sequence and the second operation timing sequence to each optical touch circuit 200. In addition, the first operation timing sequence and the second operation timing sequence can be the same as gate signals delivered by scan lines of the LCD device 800, or other signals independent from the gate signals. For example, if the first operation timing sequence and the second operation timing sequence are directly implemented by the gate signals, the scan sensing units 80 can be regarded as being electrically coupled to the scan lines. If the first operation timing sequence and the second operation timing sequence are implemented by other independent signals, the scan sensing units 80 would not be electrically coupled to the scan lines.

A source driving unit 82 is disposed at an upside of the LCD device 800. Touch sensing units 84 are disposed at an opposite side of the source driving unit 82, i.e., the downside of the LCD device 800. The touch sensing units 84 and the source driving unit 82 can be disposed at a same side of the LCD device 800 instead. Besides, a liquid crystal panel 85 is disposed at the middle of the LCD device 800, and one or more optical touch circuits 200 can be disposed in the liquid crystal panel 85. A plurality of display pixel units (not shown) are disposed in the liquid crystal panel 85 as well as the region surrounded by the frame 851, and respectively electrically coupled to the respective scan lines and data lines (for delivering display data to the display pixel units).

The gate driving units 81 are electrically coupled to the liquid crystal panel 85, and a plurality of scan lines arranged in parallel (not shown) are disposed between the gate driving units 81 and the scan sensing units 80. The plurality of scan lines are disposed in the region surrounded by the frame 851.

The source driving unit 82 is electrically coupled to the liquid crystal panel 85, and a plurality of data lines arranged in parallel (not shown) are disposed between the source driving unit 82 and the touch sensing units 84. The plurality of data lines are disposed in the region surrounded by the frame 851. Besides, the plurality of data lines are arranged crossing over with the plurality of scan lines, for example the plurality of data lines and the plurality of scan lines are arranged approximately perpendicular to each other. It needs to be pointed out that, in the plurality of data lines, the first data line 821 is closest to the gate driving units 81, and the last data line 823 is closest to the scan sensing units 80.

The touch reference unit 83 can be disposed between a left side of the first data line 821 and the gate driving units 81. The touch reference unit 83 can also be disposed between a right side of the last data line 823 and the scan sensing units 80. In other words, the touch reference units 83 can be disposed at positions closer to the frame 851 than the optical sensing unit(s), but it is not to limit the disclosure.

The touch sensing units 84 may be arranged with one or more touch sensing integrated circuits 841, 843 therein. The touch sensing integrated circuits 841, 843 is electrically coupled to the respective touch reference unit 8410, 8412, 8430 and 8432. The touch reference unit 8410 and the touch reference unit 8412 are disposed at borders of the touch sensing integrated circuit 841. In other words, the touch reference unit 8412 is disposed at the border of the touch sensing unit 84, or between two touch sensing units 84.

Sum up, in the optical touch circuit and the LCD device using the same of the disclosure, one or more touch reference units are disposed at the border(s) of the display device or the touch sensing unit(s) so as to provide a reference voltage to the touch sensing unit(s) for operation, so that the misjudgment caused by edge touch can be avoided and the accuracy of the optical touch circuit can be improved consequently.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An optical touch circuit comprising:
an optical sensing unit for being turned on or turned off according to an irradiation light intensity and accordingly generating a first signal;
a first signal readout unit, electrically coupled to the optical sensing unit, wherein the first signal readout unit is turned on or turned off according to a first operation timing sequence and accordingly outputs the first signal;
a touch reference unit, disposed at a side of the optical sensing unit and for providing a reference voltage;
a second signal readout unit, electrically coupled to the touch reference unit, wherein the second signal readout unit is turned on or turned off according to a second operation timing sequence and accordingly outputs the reference voltage; and
a touch sensing unit, electrically coupled to the first signal readout unit and the second signal readout unit, wherein the touch sensing unit is configured for using a voltage difference between the first signal and the reference voltage as a basis to determine that whether the optical touch circuit is touched or not.

2. The optical touch circuit according to claim 1, wherein the optical sensing unit comprises:

an optical sensing element, comprising a first terminal, a second terminal and a third terminal, wherein the first terminal of the optical sensing element receives a first control signal, the second terminal of the optical sensing element is electrically coupled to the first signal readout unit, the third terminal of the optical sensing element receives a second control signal, and an electrical pathway between the second terminal and the third terminal of the optical sensing element is turned on or turned off subjecting to the control of the first control signal and the irradiation light intensity; and a first storage capacitor, electrically coupled to the second terminal of the optical sensing element;

wherein a voltage on the second terminal of the optical sensing element is used as the first signal provided to the first signal readout unit.

3. The optical touch circuit according to claim 2, wherein the first signal readout unit comprises a first terminal, a second terminal and a third terminal, the first terminal of the first signal readout unit receives a third control signal, the second terminal of the first signal readout unit is electrically coupled to the first storage capacitor, and the third terminal of the first signal readout unit is electrically coupled to the touch sensing unit.

4. The optical touch circuit according to claim 3, wherein the touch reference unit comprises:

a switch element, comprising a first terminal, a second terminal and a third terminal, wherein the first terminal of the switch element receives a fourth control signal, the second terminal of the switch element is electrically coupled to the second signal readout unit, the third terminal of the switch element receives a fifth control signal, and an electrical pathway between the second terminal and the third terminal of the switch element is turned on or turned off subjecting to the control of the third control signal; and a second storage capacitor, electrically coupled to the second terminal of the switch element.

5. The optical touch circuit according to claim 4, wherein the first operation timing sequence comprises that a rising edge of the third control signal is prior to a rising edge of the first control signal, and the second operation timing sequence is that a rising edge of the fourth control signal is prior to the rising edge of the third control signal.

6. The optical touch circuit according to claim 3, wherein the touch reference unit comprises:

a first switch element, comprising a first terminal, a second terminal and a third terminal, wherein the first terminal of the first switch element receives a first control signal, the third terminal of the first switch element receives a fifth control signal, and an electrical pathway between the second terminal and the third terminal of the first switch element is turned on or turned off subjecting to the control of the third control signal;

a second storage capacitor, electrically coupled to the second terminal of the first switch element;

a second switch element, comprising a first terminal, a second terminal and a third terminal, wherein the first terminal of the second switch element is electrically coupled to the third terminal of the first switch element, the second terminal of the second switch element is electrically coupled to the second signal readout unit, the third terminal of the second switch element is electrically coupled to the second terminal of the first switch element, and an electrical pathway between the second terminal and the third terminal of the second switch element is turned on or turned off subjecting to the control of the fifth control signal; and a third storage capacitor, electrically coupled to the second terminal of the second switch element.

7. The optical touch circuit according to claim 6, wherein the first operation timing sequence and the second operation timing sequence both comprise that a rising edge of the third control signal is prior to a rising edge of the first control signal.

8. A liquid crystal display device comprising:

a frame, defining a border of the liquid crystal display device;

a plurality of scan lines, disposed in a region surrounded by the frame;

a plurality of data lines, disposed in the region surrounded by the frame and arranged crossing over with the plurality of scan lines;

a plurality of display pixel units, disposed in the region surrounded by the frame and electrically coupled to the respective scan lines and data lines;

a plurality of optical touch circuits according to claim 1, disposed in the region surrounded by the frame, wherein at least one of the touch reference units disposed at a position closer to the frame than the optical sensing units of the optical touch circuits;

a gate driving unit, disposed in the region surrounded by the frame and electrically coupled to the plurality of scan lines; and a scan sensing unit, disposed in the region surrounded by the frame, wherein the scan sensing unit is electrically coupled to the optical touch circuits to provide a first operation timing sequence and a second operation timing sequence for each of the optical touch circuits.

9. The liquid crystal display according to claim 8, wherein the touch reference unit is disposed between a left side of the first data line of the plurality of data lines and the gate driving unit.

10. The liquid crystal display according to claim 8, wherein the touch reference unit is disposed between a right side of the last data line of the plurality of data lines and the scan sensing unit.

11. The liquid crystal display according to claim 8, wherein the touch reference unit is disposed at a border of the touch sensing unit.

12. The liquid crystal display device according to claim 8, wherein the optical sensing unit in each of the optical touch circuits comprises:

an optical sensing element, comprising a first terminal, a second terminal and a third terminal, wherein the first terminal of the optical sensing element receives a first control signal, the second terminal of the optical sensing element is electrically coupled to the first signal readout unit, the third terminal of the optical sensing element receives a second control signal, and an electrical pathway between the second terminal and the third terminal of the optical sensing element is turned on or turned off subjecting to the control of the first control signal and the irradiation light intensity; and a first storage capacitor, electrically coupled to the second terminal of the optical sensing element;

wherein a voltage on the second terminal of the optical sensing element is used as the first signal provided to the first signal readout unit.

13. The liquid crystal display device according to claim 12, wherein the first signal readout unit in each of the optical touch circuits comprises a first terminal, a second terminal and a third terminal, the first terminal of the first signal readout unit receives a third control signal, the second terminal of the first signal readout unit is electrically coupled to the first storage capacitor, and the third terminal of the first signal readout unit is electrically coupled to the touch sensing unit.

14. The liquid crystal display device according to claim 13, wherein the touch reference unit in each of the optical touch circuits comprises:
- a switch element, comprising a first terminal, a second terminal and a third terminal, wherein the first terminal of the switch element receives a fourth control signal, the second terminal of the switch element is electrically coupled to the second signal readout unit, the third terminal of the switch element receives a fifth control signal, and an electrical pathway between the second terminal and the third terminal of the switch element is turned on or turned off subjecting to the control of the third control signal; and
- a second storage capacitor, electrically coupled to the second terminal of the switch element.

15. The liquid crystal display device according to claim 14, wherein the first operation timing sequence is that a rising edge of the third control signal is prior to a rising edge of the first control signal, and the second operation timing sequence is that a rising edge of the fourth control signal is prior to the rising edge of the third control signal.

16. The liquid crystal display device according to claim 13, wherein the touch reference unit in each of the optical touch circuits comprises:
- a first switch element, comprising a first terminal, a second terminal and a third terminal, wherein the first terminal of the first switch element receives a first control signal, the third terminal of the first switch element receives a fifth control signal, and an electrical pathway between the second terminal and the third terminal of the first switch element is turned on or turned off subjecting to the control of the third control signal;
- a second storage capacitor, electrically coupled to the second terminal of the first switch element;
- a second switch element, comprising a first terminal, a second terminal and a third terminal, wherein the first terminal of the second switch element is electrically coupled to the third terminal of the first switch element, the second terminal of the second switch element is electrically coupled to the second signal readout unit, the third terminal of the second switch element is electrically coupled to the second terminal of the first switch element, and an electrical pathway between the second terminal and the third terminal of the second switch element is turned on or turned off subjecting to the control of the fifth control signal; and
- a third storage capacitor, electrically coupled to the second terminal of the second switch element.

17. The liquid crystal display device according to claim 16, wherein the first operation timing sequence and the second operation timing sequence both are that a rising edge of the third control signal is prior to a rising edge of the first control signal.

* * * * *